United States Patent [19]

Inoue et al.

[11] Patent Number: 4,470,668

[45] Date of Patent: Sep. 11, 1984

[54] REACTION SETTING, POLYMER, SEALING MATERIAL FOR LIQUID CRYSTAL DISPLAYS

[75] Inventors: Hiroshi Inoue, Tokyo; Sumio Kamoi, Funabashi, both of Japan

[73] Assignee: Ricoh Company, Ltd., Tokyo, Japan

[21] Appl. No.: 513,127

[22] Filed: Jul. 13, 1983

Related U.S. Application Data

[62] Division of Ser. No. 369,780, Apr. 19, 1982, abandoned.

[30] Foreign Application Priority Data

Apr. 28, 1981 [JP] Japan .................. 56-64574

[51] Int. Cl.$^3$ .............................................. G02F 1/133
[52] U.S. Cl. ........................................ 350/343; 525/478
[58] Field of Search ............... 350/343, 344, 339 R, 350/334

[56] References Cited

U.S. PATENT DOCUMENTS

| 3,992,355 | 11/1976 | Itoh et al. | 260/46.5 UA |
| 4,227,779 | 10/1980 | Bissar et al. | 350/343 X |
| 4,297,401 | 10/1981 | Chern et al. | 350/343 X |
| 4,325,610 | 4/1982 | Inou et al. | 350/343 |
| 4,407,870 | 10/1983 | Clerc et al. | 350/343 X |

FOREIGN PATENT DOCUMENTS

| 2427738 | 1/1975 | Fed. Rep. of Germany | 525/478 |
| 70527 | 6/1981 | Japan | 350/341 |
| 58-52618 | 3/1983 | Japan . | |
| 1310353 | 3/1973 | United Kingdom | 525/478 |

OTHER PUBLICATIONS

Penz et al., "Plastic Substrate LCD" SID 81 Digest pp. 116–117, 1981.

Primary Examiner—John K. Corbin
Assistant Examiner—David Lewis
Attorney, Agent, or Firm—Flynn, Thiel, Boutell & Tanis

[57] ABSTRACT

A sealing material particularly suitable for producing liquid crystal display panels of which the base plates are made of flexible polymer film, which sealing material comprises a reaction-setting type polymer containing siloxane bonds in the molecules, which polymer is represented by the following general formula

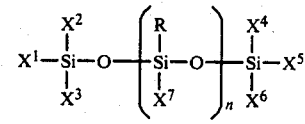

wherein R represents a lower alkyl group, and $X^1$, $X^2$, $X^3$, $X^4$, $X^5$, $X^6$ and $X^7$ independently represent radicals selected from the group consisting of hydroxy, acetoxy, alkoxy, hydrogen, vinyl, epoxy, amino, glycol, phenyl, fluorinated alkyl and lower alkyl, and at least one of $X^1$ through $X^7$ is a radical selected from the group consisting of hydroxy, acetoxy, alkoxy, hydrogen, vinyl, epoxy, amino and glycol, and n represents an integer of 5 to 10000. Since sealing material has high sealing strength for the polymer film over a long period of time and is free from solvents, the liquid crystal, the orientation processed films, the transparent electrodes and the base plates of the liquid display panels are not caused to deteriorate by this sealing material.

11 Claims, 6 Drawing Figures

IR SPECTRUM OF TORAY SILICONE SE 1700 (CLEAR TYPE)

FIG. 6
COMPARATIVE IR SPECTRA OF TORAY SILICONE SE 1700 (CLEAR TYPE) AND OTHER POLYMERS

REACTION SETTING, POLYMER, SEALING MATERIAL FOR LIQUID CRYSTAL DISPLAYS

This application is a division of U.S. Ser. No. 369,780 filed Apr. 19, 1982, abandoned.

BACKGROUND OF THE INVENTION

The present invention relates to a sealing material for producing liquid crystal display panels, and more particularly to a sealing material for producing liquid crystal display panels of which the base plates are made of flexible polymer film.

Conventional liquid crystal display apparatuses which are now in general use comprise a rigid case made of a metal or hard synthetic resin, and a liquid display panel of which base plates are made of inorganic glass and are fitted into the rigid case, with a liquid crystal being sealed between the base plates. These conventional liquid crystal display apparatuses have several shortcomings. For example, they are heavy and fragile, since the base plates are made of inorganic glass which is itself heavy and fragile. Due to the use of these fragile inorganic glass base plates, care must be taken when handling or carrying the display apparatus. It is also difficult to work the base plates into the desired shapes. In order to protect the display panel, a very rigid and strong case is indispensable. The result is that they are heavy and not suitable in many applications.

In order to eliminate these shortcomings of the conventional liquid crystal display apparatuses, there has been proposed the replacement of the inorganic-glass-made base plate by a polymer film which is flexible, light but strong, and excellent in workability. However, when constructing such a liquid crystal display panel in which a liquid crystal is sealed between base plates made of such a polymer film, the conventional adhesive agents, for instance, epoxy adhesive agents that are used for sealing the inorganic glass base plates, do not provide sufficient sealing with the polymer film.

Before explaining the necessary conditions for a sealing material for use in such polymer-film-made liquid crystal display panel, the structure of an example of a liquid crystal display panel, which is described in Japanese patent application No. 56-152274 filed on Sept. 24, 1981, will now be explained by referring to FIG. 1, which schematically shows the cross section of a liquid crystal display panel.

In the figure, reference numeral 1 represents an upper base plate; reference numeral 2, a lower base plate; reference numerals 3 and 4 each, transparent electrodes; reference numeral 5, a lead electrode; reference numeral 6, a thin film; reference numeral 7, an upper and lower liquid-crystal-orientation processed film; reference numeral 8, spacer particles for maintaining the gap between the upper and lower liquid-crystal-orientation processed films 7; reference numeral 9, a twisted-nematic liquid crystal (hereinafter simply referred to as the liquid crystal); reference numeral 10, a polarizer; and reference numeral 11, a sealing material.

As can be seen from the figure, in the constructed state, the sealing material 11 is in contact with the liquid crystal 9, the orientation-processed film 7, the transparent electrodes 3 and 4, the lead electrode 5, the upper base plate 1 and the lower base plate 2. Further, in the course of producing such liquid crystal display panels, the sealing material 11, before it becomes hard, may come into contact with, for example, the liquid crystal 9, the orientation processed film 7, the transparent electrode 3 and the base plates 1 and 2. Because of this possibility, common sealing materials containing solvents have the following shortcomings, if they are used for the liquid crystal display panels of the above-mentioned type:

1. The adhesion strength between the polymer film and the other elements is not high enough and cannot be maintained uniform over a long period of time.
2. The sealing material has adverse effects, for instance, causes deterioration of the liquid crystal, the orientation processed films, the transparent electrodes, the base plates or other elements with which the sealing material may come into contact, before and after the sealing material becomes hard.
3. If the sealing material is not of a solvent-free type, the above-mentioned adverse effects are considerable.
4. If the sealing material does not retain its flexibility after it becomes hard, a key feature of the liquid crystal display panel employing base plates made of polymer film, i.e., that the liquid crystal display panel is flexible, is not attained.

For such a particular use, sealing materials which can meet the above-described conditions have not been proposed, and, therefore, a liquid crystal display panel made of such a polymer-film has not been produced for practical use. This is inspite of the fact that a great number of sealing materials and adhesive agents have been produced and put on the market for general use or for other purposes.

SUMMARY OF THE INVENTION

It is therefore an object of the present invention to provide a sealing material for producing liquid crystal display panels of which the base plates are made of flexible polymer film.

A sealing material according to the present invention comprises a reaction-setting type polymer containing siloxane bonds in the molecule, which polymer is represented by the following general formula wherein R represents a lower alkyl group, and $X^1$, $X^2$, $X^3$, $X^4$, $X^5$, $X^6$ and $X^7$ independently represent radicals selected from the group consisting of hydroxy, acetoxy, alkoxy, hydrogen, vinyl, epoxy, amino, glycol, phenyl, fluorinated alkyl and lower alkyl, and at least one of $X^1$ through $X^7$ is a radical selected from the group consisting of hydroxy, acetoxy, alkoxy, hydrogen, vinyl, epoxy, amino and glycol, and n represents an integer of 5 to 10,000.

This sealing material can be used solely or in combination with a polysiloxane including a functional group of and, if necessary, together with an additive, such as a platinate, or with a filler, such as silica gel.

According to the present invention, the following advantages are attained by use of the above-described polymer in the sealing material:

High adhesion strength for the polymer film and an excellent sealing effect over a long period of time, free from adverse effects on the liquid crystal, the orientation processed films, the transparent electrodes or the base plates, and deterioration of those elements before and after the sealing material becomes hard, with excellent flexibility after it becomes hard.

DETAILED DESCRIPTION OF THE PREFERRED EMBODIMENTS

Figure 1:
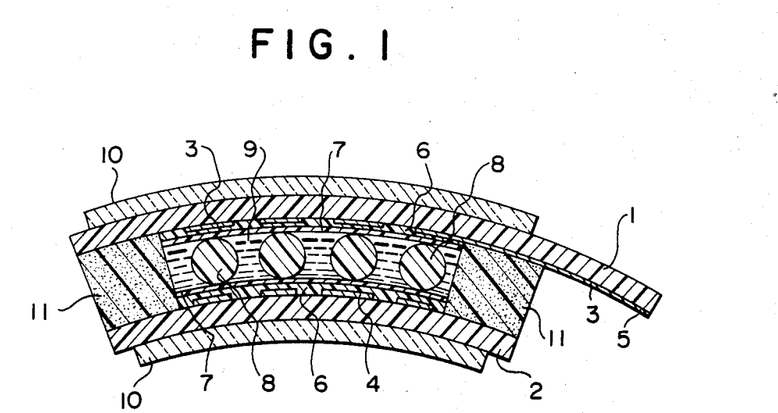
FIG. 1 is a schematic cross section of an example of a liquid crystal display panel.
Figure 2:
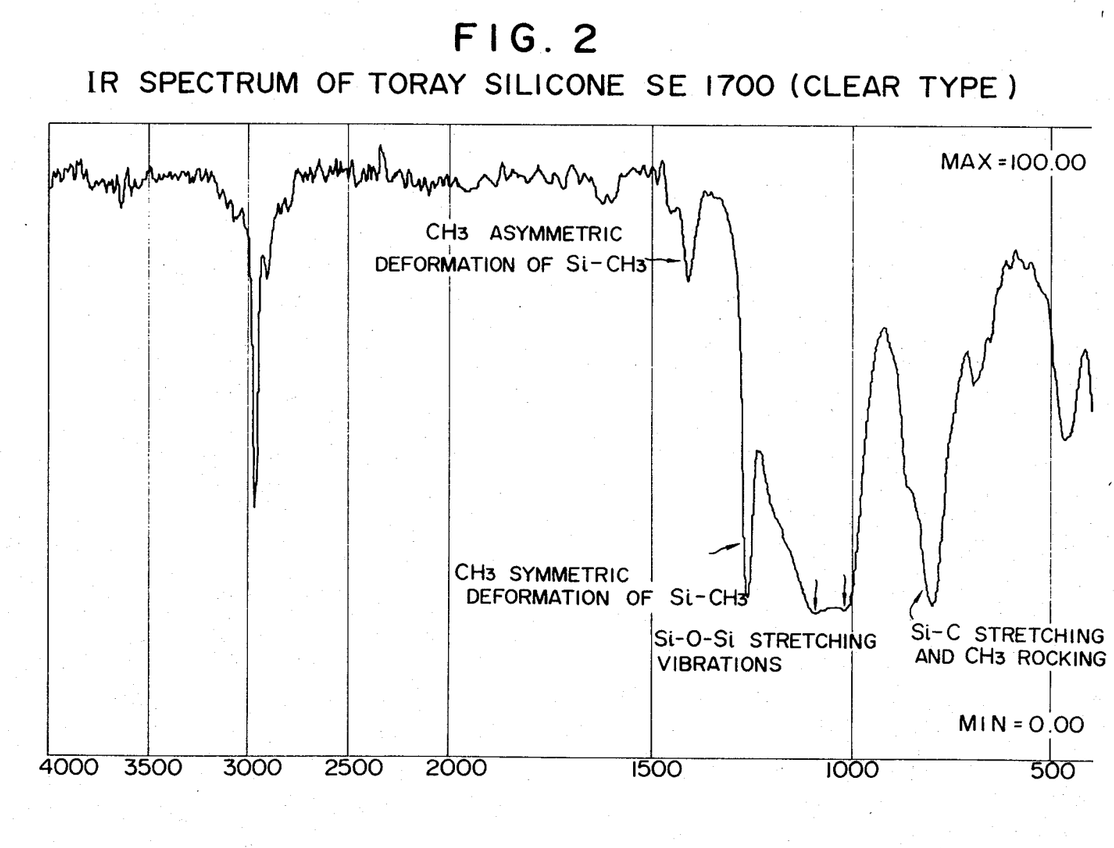
FIG. 2 is an IR spectrum chart of Toray Silicone SE 1700 Clear Type, which is a polydimethyl siloxane.
Figure 3:
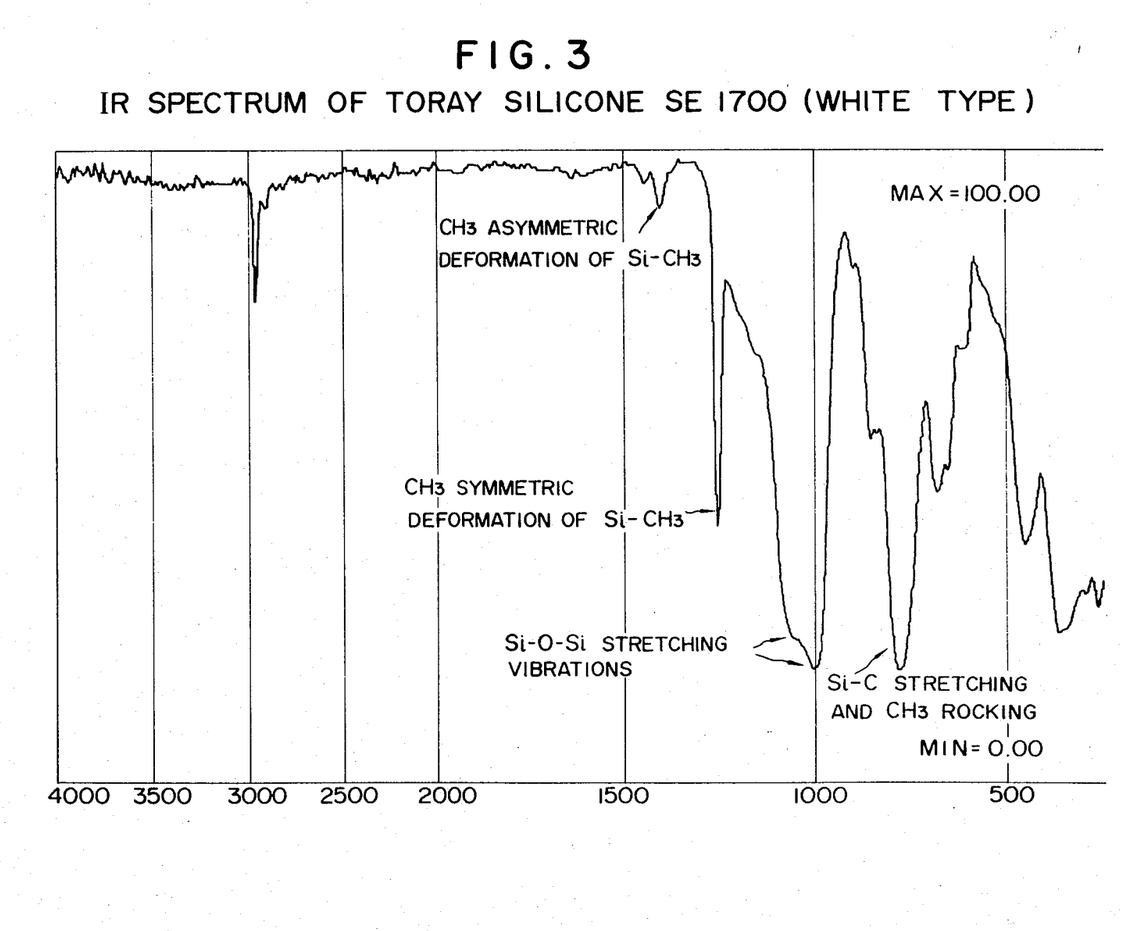
FIG. 3 is a comparative IR spectrum chart of Toray Silicone SE 1700 White Type, which is another polydimethyl siloxane.
Figure 4:
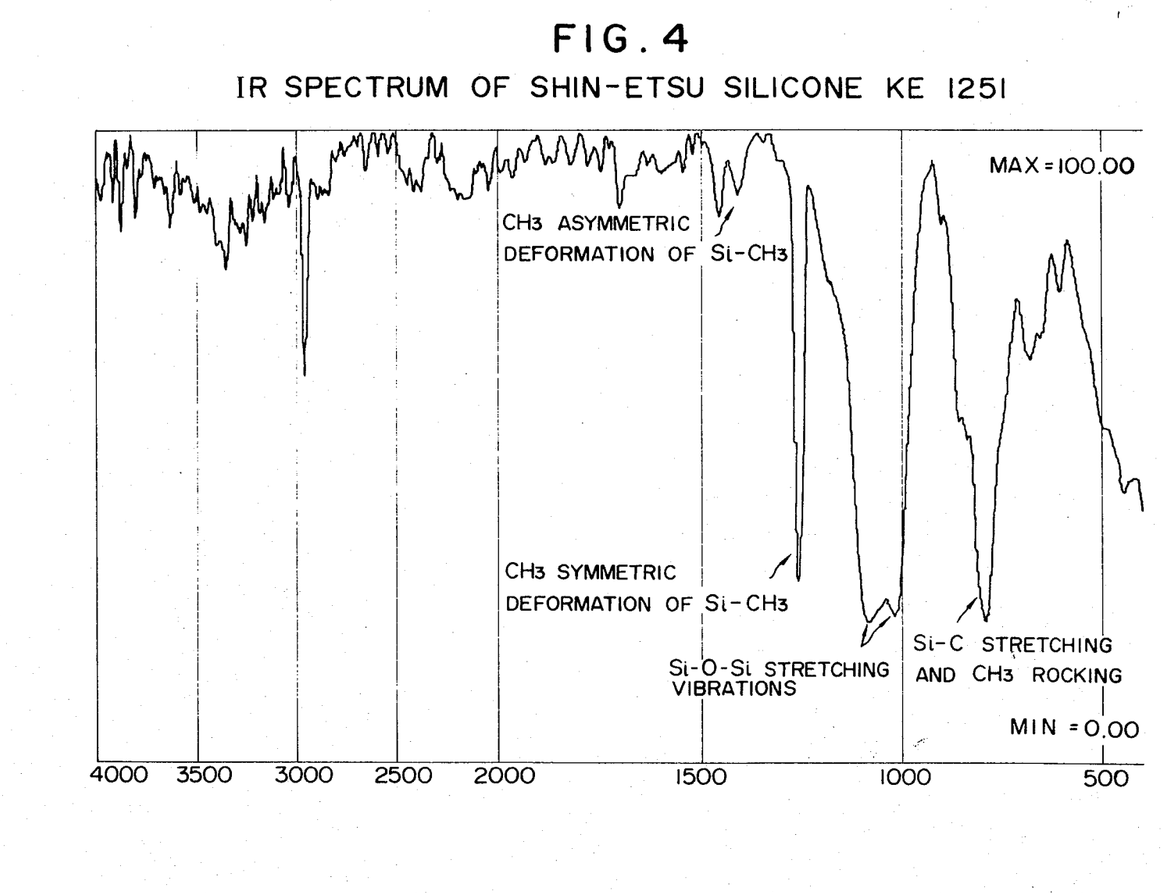
FIG. 4 is an IR spectrum chart of Shin-etsu Silicone KE 1251, which is a further polydimethyl siloxane.

The sealing material according to the present invention can be employed for constructing, for example, a liquid crystal display panel as shown in FIG. 1. As mentioned previously, the liquid crystal display panel shown in FIG. 1 is described in Japanese patent application No. 56-152274 filed on Sept. 24, 1981. This liquid crystal display panel shown in FIG. 1 is but an example to which the sealing material according to the present invention can be employed, and, as matter of course, the sealing material can be applied to any liquid crystal display panel employing base plates made of polymer film.

In the figure, the base plates 1 and 2 can be made of, for example, a polyethylene-terephthalate film, a polybutylene-terephtharate film, a polyether-sulfone film, a polycarbonate film or a polysulfone film.

The liquid-crystal-orientation processed film 7 is made of, for example, saturated polyester; a reaction product of saturated polyester and strengthening agents, such as reactive titanium compounds, isocyanate compounds, epoxy resin, acetic anhydride and melamine resin; a mixture of saturated polyester and nylon; or a reaction product of saturated polyester, nylon and an above-mentioned strengthening agent.

The transparent electrodes 3 and 4 are made by a conventional procedure in which, for example, tin oxide or indium oxide is deposited on the base plates 1 and 2.

The thin film 6 is a film made of a metal oxide, such as titanium oxide, silicon oxide or aluminum oxide, having approximately the same expansion coefficient as that of the transparent electrodes 3 and 4. The thin film 6 is for increasing the mechanical strength of the liquid display panel, and, accordingly, it is not necessarily an indispensable element in the liquid crystal display panel.

The spacer particles 8 are made, for example, of a synthetic resin or silica gel. A method of producing the spacer particles made of a synthetic resin is described in Japanese patent application No. 56-97028 filed on June 23, 1981.

The sealing material according to the present invention is a reaction-setting type polymer containing siloxane bonds, which polymer is represented by the following general formula wherein R represents a lower alkyl group, and $X^1$, $X^2$, $X^3$, $X^4$, $X^5$, $X^6$ and $X^7$ independently represent radicals selected from the group consisting of hydroxy, acetoxy, alkoxy, hydrogen, vinyl, epoxy, amino, glycol, phenyl, fluorinated lower alkyl and lower alkyl, and at least one of $X^1$ through $X^7$ is a radical selected from the group consisting of hydroxy, acetoxy, alkoxy, hydrogen, vinyl, epoxy, amino and glycol, and n represents an integer of 5 to 10,000.

Commercially available examples of a polysiloxane in which R and $X^7$ are both methyl are as follows:

Dow-Corning 200; General Electric SF69, SF96 and SS 4107; Toray Silicone SE 1700 Clear Type and Toray Silicone SE 1700 White Type, which include at the molecular end; Toray Silicone JCR-6120 which is an oligomer of dimethyl siloxane containing at the molecular end; a mixture of (1) JCR-6100 which is a polydimethyl siloxane containing at the molecular end, (2) SE-1700 Catalyst consisting essentially of an oligomer of dimethyl siloxane containing epoxy group at the molecular end, an oligomer of dimethyl siloxane containing at the molecular end, and platinate, and (3) JCR-6120 Liquid C which is an oligomer of dimethyl siloxane containing at the molecular end, the weight ratio of the three main components being 100:10:1; Shin-etsu Silicone KE 1251, Shin-etsu Silicone KE-1800, and Shin-etsu Silicone RTVX 32-405.

Commercially available examples of a polysiloxane in which R is methyl and $X^7$ is phenyl are as follows:

General Electric SF1023, SFSR82 and SR112.

Polymers containing other functional groups, such as hydroxyl, alkoxy, silanol, vinyl group or $-C_3H_4F_3$, in addition to methyl or phenyl, can also be used in the present invention.

Examples of a commercially available polysiloxane containing hydroxyl group are General Electric SR-173 and SR-174.

An example of a commercially available polysiloxane containing alkoxy group is General Electric SR-191.

An example of a commercially available polysiloxane containing silanol group is Dow-Corning 840.

The above-described reaction-setting type polysiloxanes having siloxane bonds can be solely used, that is, as the so-called one-liquid self-cross-linking type sealing material, or in combination with a polysiloxane containing an group at its molecular end, that is, as the so-called two-liquid mixing type sealing material.

To the sealing material according to the present invention, a metallic salt, such as platinate, can also be added as a reaction acceleration agent.

A metallic oxide, such as silica gel or titanium oxide, can also be added to the sealing material as a filler in order to change the color of the sealing material or to adjust the viscosity thereof or to improve other properties of the sealing material.

To the sealing material, additives, such as phosphor, phosphorous compounds, nitrogen compounds, sulfur, sulfur compounds, organometallic compounds and flux can be added. However, in some polymers, those additives have adverse effects on the hardening properties of the sealing material. Therefore, care must be taken when choosing such additives.

The polymers that can be employed in the present invention can be identified with certainty by infra-red spectra.

For example, in the case of polydimethyl siloxane, its functional groups show absorption in the ranges listed below:

| Functional Group | $cm^{-1}$ |
|---|---|
| Si-O-Si stretching vibrations | 1000 to 1100 |
| $CH_3$ symmetric deformation of Si-$CH_3$ | 1260 |
| $CH_3$ asymmetric deformation of Si-$CH_3$ | 1410 |
| Si-C stretching and $CH_3$ rocking | 800 |
| C-H stretching vibrations of $CH_3$ | 3000 to 2800 |
| Si-O-Si and O-Si-$CH_3$ bending vibrations | 510 to 390 |
| Si-H stretching vibrations | 2160 |

In the case of polymethylphenyl siloxane, the Si—O—Si stretching vibrations give rise to a particular absorption in the same range as mentioned above.

Figure 5:
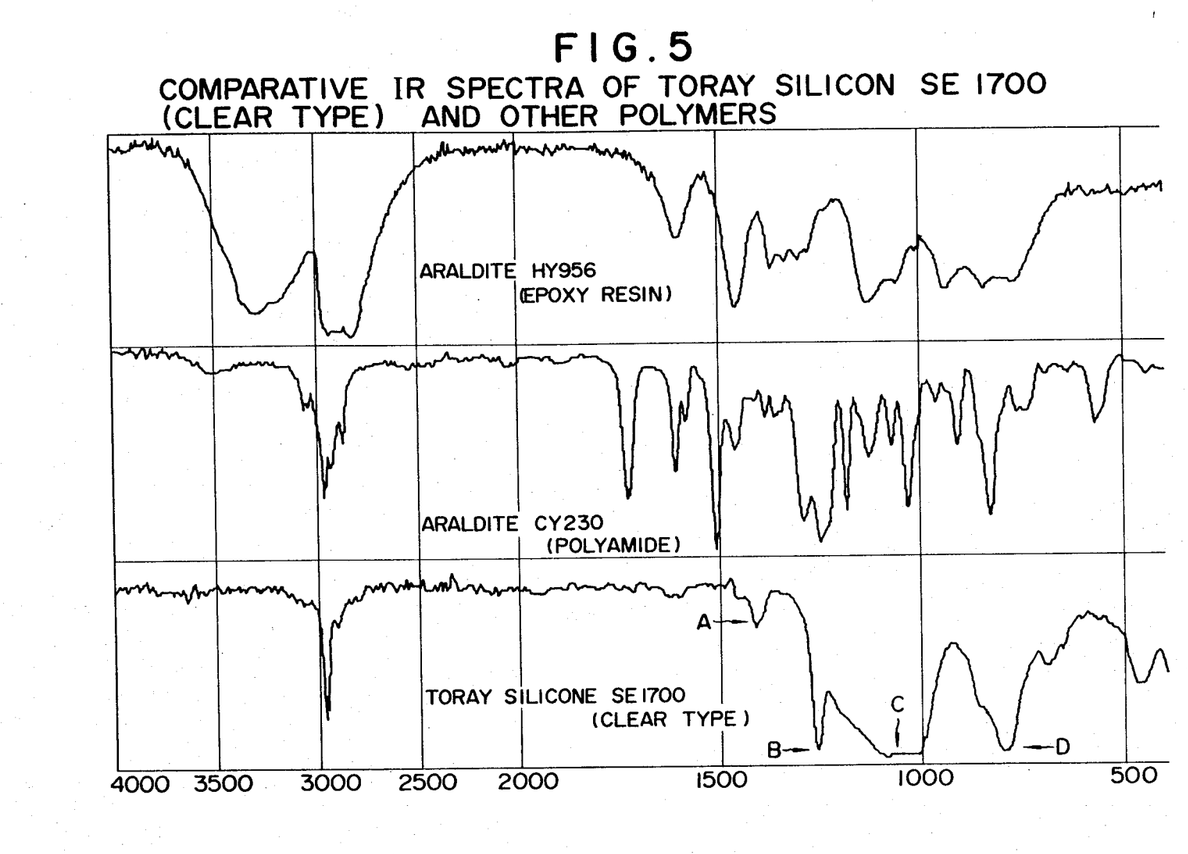
FIG. 5 shows the comparative IR spectra of Toray Silicone SE 1700 Clear Type and two other conventional adhesive polymers, ARALDITE HY956 and ARALDITE CY230, both of which are epoxy resins.
Figure 6:
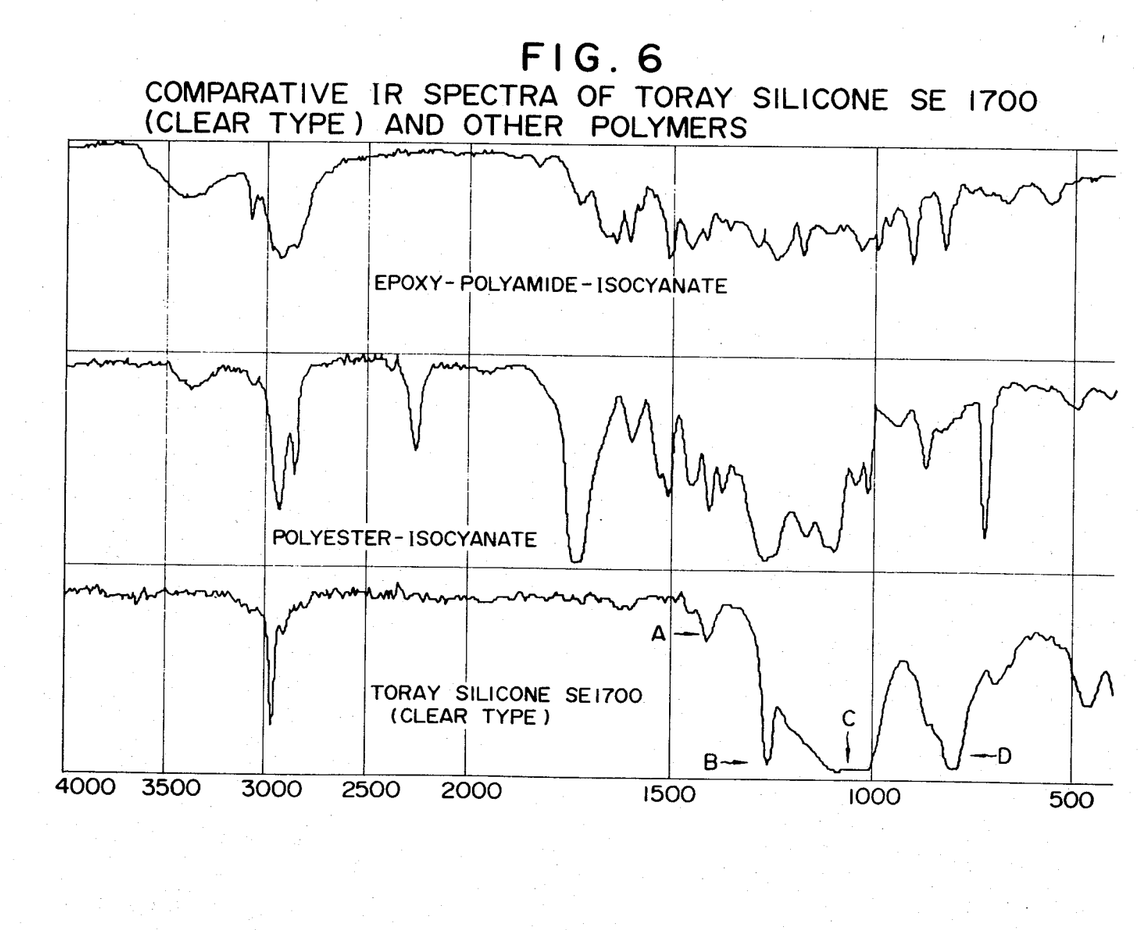
FIG. 6 shows the comparative IR spectra of Toray Silicone SE 1700 Clear Type and two other conventional adhesive polymers, expoxy-polyamide-isocyanate and polyester-isocyanate.

Referring to FIG. 5 and FIG. 6, the characteristic absorptions in the IR spectrum of a polysiloxane compound (Toray Silicone SE 1700 Clear Type), for instance, the absorption ranges shown by A, B, C and D, and the IR spectra of the other polymers employed as adhesive agents or sealing materials for general use, such as epoxy resin, polyamide resin, epoxy-polyamide-isocyanate resin and polyester-isocyanate resin, can be easily and conspicuously distinguished from each other.

By use of at least one of the above described polymers, a sealing material having the following advantages, among others, is obtained when producing liquid crystal display panels of which the base plates are made of flexible polymer film.

1. High adhesion strength to the polymer film that lasts over a long period of time.
2. No deterioration of the liquid crystal, the orientation processed films, the transparent electrodes or the base plates before or after it becomes hard, since the sealing material is of a solvent-free type.
3. The sealing material retains its flexibility after it becomes hard, so that the liquid crystal display panel is flexible.
4. The liquid crystal display panel prepared by use of a sealing material according to the present invention is excellent in heat- and cold-resistance and has high operational reliability.

Embodiments of a sealing material according to the present invention will now be explained more specifically by referring to the following examples:

EXAMPLE 1

A liquid crystal display panel of the type as shown in FIG. 1 was prepared as follows:

Transparent electrodes 3 and 4 consisting essentially of indium oxide were formed in the form of thin films by a conventional procedure on a pair of polyethyleneterephthalate films with a thickness of 100 μm which served as the base plates 1 and 2 in FIG. 1. A reaction product of an epoxy resin, nylon and a titanium compound was applied to the base plates 1 and 2, and the transparent electrodes so as to cover them; thus liquid-crystal-orientation processed films were formed. Those liquid-crystal-orientation processed films were subjected to horizontal-orientation processing. A divinylbenzene/ethylvinyl copolymer, with a particle size of 10 μm, was dispersed in an amount of 0.5 wt.% in ethyl alcohol and was then applied to the liquid-crystal-orientation processed film 7, followed by drying at 80° C. for 10 minutes, whereby spacer particles 8 were formed. A sealing material comprising the following components, which was of a two-liquid mixing type, was applied to one of the films in a conventional mask printing procedure:

|  | Parts by Weight |
| --- | --- |
| Toray Silicone SE 1700 Clear Type containing a platinate-based catalyst | 100 |
| $-\underset{\mid}{\overset{\mid}{Si}}-H$ containing polydimethyl siloxane | 10 |
| Silica gel with a particle size of not greater than 10 μm | 5 |

The two films were superimposed on each other and allowed to stand at 150° C. for 15 minutes, so that the two films were firmly attached to each other, forming a space therebetween for a liquid crystal.

(1) Peel Strength Test

In order to investigate the peeling strength of the sealing material according to the present invention, a polyethylene-terephthalate tape with a width of 25.4 mm, made of the above-mentioned polyethylene-terephthalate film, was applied to a sheet of the polyethylene-terephthalate film by use of the sealing material. The above-described polyethylene-terephthalate film was peeled off the polyethylene-terephthalate film at a speed of 50 mm/min. The force required to perform such peeling was 800 g, which was measured by a peel strength measurement apparatus, whereby the peel strength of this sealing material was determined to be 800 g/25.4 mm.

(2) Sealing Test

In order to investigate the sealing performance of the sealing material, 10 blank display panels which did not contain a liquid crystal were prepared with a seal width being in the range of 0.5 mm to 0.8 mm, under the same procedure as described above. The 10 blank display panels were then placed in a closed container containing red ink, under application of a pressure of 3 kg/cm$^2$ to those blank display panels, for 4 days, followed by visual inspection of the penetration of the red ink into those blank display panels.

The result was that none of those display panels was penetrated by the red ink.

(3) Initial Liquid Crystal Orientation Test

A biphenyl type liquid crystal with its dielectric anisotropy being Δε>0 (made by BDH Company, Ltd. under the brand of "E-7") was loaded between the films and was then sealed with the above prepared sealing material. Under this procedure, 40 liquid crystal display panels as shown in FIG. 1 were prepared.

The initial orientation state of the liquid crystal was visually inspected immediately after the liquid crystal was loaded in those display panels. The result was excellent.

(4) High Temperature Aging Test at 60° C.

After the liquid crystal was sealed in each of 20 display panels, an electric current of 1 μA was caused to flow in the display panels through the transparent electrodes, and those display panels were allowed to stand at 60° C. in a thermostat. Thus, the earliest time out of (i) the time required before the consumed electric current was doubled, (ii) the time required before the liquid crystal began to be colored (by visual inspection) and (iii) the time required before the liquid crystal began to be bubbled (by visual inspection), was regarded as the maximum durable time.

The result of this test showed that, of the 20 liquid display panels, 16 panels (80%) were durable in the range of 800 hours to 1,100 hours.

(5) High Humidity Aging Test at 45° C. and 90%RH 20 liquid crystal panels prepared for the initial liquid crystal orientation test were subjected to a high humidity aging test at 45° C. and 90% RH. The result was that, of the 20 liquid crystal panels, 18 panels (90%) were durable in the range of 600 hours to 1,000 hours.

EXAMPLE 2

Example 1 was repeated except that the Toray Silicone SE 1700 Clear Type was replaced by Shinetsu Silicone KE-1251, which is a one-liquid self-cross-linking type sealing material. The same tests as conducted in Example 1 were performed.

The results were as follows:

(1) The peel strength was 500 g/24.5 mm.

(2) In the sealing test, none of the display panels was penetrated by the red ink.

(3) The initial liquid crystal orientation was excellent.

(4) The result of the aging test at 60° C. was that, of the 20 liquid display panels, 16 panels (80%) were durable for approximately 600 hours.

(5) The result of the aging test at 45° C. and 90%RH was that, of the 20 liquid crystal panels, 18 panels (90%) were durable in the range of 600 hours to 1,000 hours. This result was the same as that in Example 1

EXAMPLE 3

Example 1 was repeated except that the sealing material employed in Example 1 was replaced by a sealing material comprising the following components, which was of a two-liquid mixing type.

|  | Parts by Weight |
| --- | --- |
| Toray Silicone SE 1700 Clear Type containing a platinate-based catalyst | 100 |
| -Si-H containing polydimethyl siloxane | 10 |
| Homopolymer of butylmethacrylate with a particle size of not greater than 10 μm | 3 |

With respect to the peel strength test, the sealing test, the initial liquid crystal orientation test and the aging test at 60° C., the results were the same as those in Example 1. The result of the aging test at 45° C. and 90%RH was that, of the 20 liquid crystal panels, 18 panels (90%) were durable for about 800 hours.

EXAMPLE 4

Example 1 as repeated except that the Toray Silicone SE 1700 Clear Type was replaced by Toray Silicone JCR-6120.

The results were as follows:

(1) The peel strength was 500 g/24.5 mm.

(2) In the sealing test, none of the display panels was penetrated by the red ink.

(3) The initial liquid crystal orientation was excellent.

(4) The result of the aging test at 60° C. was that, of 20 liquid display panels, 16 panels (80%) were durable for approximately 600 hours.

(5) The result of the aging test at 45° C. and 90%RH was that, of the 20 liquid crystal panels, 18 panels (90%) were durable in the range of 600 hours to 1,000 hours. This result was the same as that in Example 1.

EXAMPLE 5

Example 1 as repeated except that the Toray Silicone SE 1700 Clear Type was replaced by a mixture of JCR-6100, SE-1700 Catalyst and JCR-6120 Liquid C (100:10:1 parts by weight).

The results were the same as in Example 4.

EXAMPLE 6

Example 1 as repeated except that the Toray Silicone SE 1700 Clear Type was replaced by Shin-etsu Silicone KE 1800.

The results were as follows:

(1) The peel strength was 600 g/24.5 mm.

(2) In the sealing test, none of the display panels was penetrated by the red ink.

(3) The initial liquid crystal orientation was excellent.

(4) The result of the aging test at 60° C. was that, of 20 liquid display panels, 16 panels (80%) were durable for approximately 600 hours.

(5) The result of the aging test at 45° C. and 90% RH was that, of the 20 liquid crystal panels, 18 panels (90%) were durable in the range of 600 hours to 1,000 hours. This result was the same as that in Example 1.

COMPARATIVE EXAMPLE 1

For comparison, Example 1 was repeated except that the sealing material employed in Example 1 was replaced by a sealing material comprising the following components:

| | Parts by Weight |
|---|---|
| ARALDITE AW106 (Epoxy resin) | 100 |
| ARALDITE HY956 (Polyamine) | 50 |
| Silica gel with a particle size of not greater than 10 μm | 5 |

The results were as follows:

(1) The peel strength was less than 150 g/24.5 mm. In this test, the peel strength was so small that the exact value could not be obtained by the peel strength measurement apparatus, but at the moment the film was peeled off the measurement apparatus indicated 150 g. Therefore the above value simply indicates that the peel strength was extremely small.

(2) In the sealing test, out of 10 display panels, 8 panels were penetrated by the red ink.

(3) The initial liquid crystal orientation was partially improper.

(4) Since the results of the above (1) through (3) were not good, the aging tests at 60° C. and at 45° C. and 90%RH were omitted.

COMPARATIVE EXAMPLE 2

Example 1 was repeated except that the sealing material employed in Example 1 was replaced by a sealing material comprising the following components and the two films to which that sealing material was applied were heated at 150° C. for 30 minutes:

| | Parts by Weight |
|---|---|
| Toyobo Vylon 30 P (Unsaturated Polyester) | 10 |

-continued

| | Parts by Weight |
|---|---|
| m-phenylene diisocyanate | 1 |
| Methylene chloride | 90 |

The results were as follows:

(1) The peel strength was in the range of 500 g/24.5 mm to 800 g/24.5 mm.

(2) In the sealing test, out of 10 display panels, 7 panels were penetrated by the red ink.

(3) The initial liquid crystal orientation was good.

(4) The result of the aging test at 60° C. was that, of 20 liquid display panels, 18 panels (90%) were durable only for 100 hours, which was the maximum durable time, i.e., none was durable for more than 100 hours.

(5) The result of the aging test at 45° C. and 90%RH was that, of the 20 liquid crystal panels, the liquid crystals in 18 panels (90%) were colored reddish or blackish or bubbled within 48 hours.

These comparative tests indicate that the sealing materials according to the present invention have excellent sealing properties with respect to the polymer films used as the base plates of the liquid display panel described previously, while the sealing materials comprising epoxy resin or unsaturated polyester cannot be used in practice for such liquid display panels.

What is claimed is:

1. In a liquid crystal display element comprising upper and lower substrates both made of flexible polymeric film, a layer of liquid crystal material disposed between said substrates and sealing material surrounding said layer of liquid crystal material and sealing the space between said substrates to form a closed cell, the improvement which comprises: said sealing material is free of solvents and comprises a reaction-setting type polymer containing siloxane bonds, and shows a characteristic infra-red absorption at least in the range of 1,000 cm$^{-1}$ to 1,100 cm$^{-1}$.

2. A liquid crystal display element as claimed in claim 1, wherein said reaction-setting type polymer is a polymer represented by the formula wherein R represents a lower alkyl group, and $X^1$, $X^2$, $X^3$, $X^4$, $X^5$, $X^6$ and $X^7$ independently represent radicals selected from the group consisting of hydroxy, acetoxy, alkoxy, hydrogen, vinyl, epoxy, amino, glycol, phenyl, fluorinated alkyl and lower alkyl, and at least one of $X^1$ through $X^7$ is a radical selected from the group consisting of hydroxy, acetoxy, alkoxy, hydrogen, vinyl, epoxy, amino and glycol, and n represents an integer of 5 to 10,000.

3. A liquid crystal display element as claimed in claim 1, further comprising a polydimethyl siloxane containing a group of at its molecular end.

4. A liquid crystal display element as claimed in claim 1, further comprising a filler comprising a metal oxide selected from the group consisting of silica gel and titanium oxide.

5. A liquid crystal display element as claimed in claim 1, further comprising a hardening reaction acceleration agent comprising platinate.

6. A liquid crystal display element as claimed in claim 1, wherein said polymer film is a film selected from the group consisting of polyethylene-terephthalate film, polybutylene-terephthalate film, polyether-sulfone film, polycarbonate film and polysulfone film.

7. A liquid crystal display element as claimed in claim 2, wherein, in said general formula, R and $X^7$ each represent a methyl group, and at least one of $X^1$ through $X^6$ is hydrogen.

8. A liquid crystal display element as claimed in claim 2, wherein, in said general formula, R represents a methyl group and $X^7$ represents a phenyl group.

9. A liquid crystal display element comprising: a twisted-nematic liquid crystal layer; upper and lower transparent substrates disposed on opposite sides of said liquid crystal layer, said substrates both being made of flexible polymeric film, selected from the group consisting of polyethylene terephthalate films, polybutylene terephthalate films, polyether sulfone films, polycarbonate films and polysulfone films; upper and lower transparent electrodes supported on the opposed inner faces of said upper and lower substrates respectively, said electrodes being effective to apply an electric field to said liquid crystal layer; upper and lower polarizers mounted on the outer faces of said upper and lower substrates; and a layer of sealing material disposed between said substrates surrounding said liquid crystal layer, said sealing material consisting essentially of a solvent-free, reaction-setting polysiloxane.

10. A liquid crystal display element as claimed in claim 9 including spacer particles disposed between said substrates for maintaining a substantially uniform spacing between said substrates.

11. A liquid crystal display element as claimed in claim 9 including upper and lower liquid crystal orientation films disposed between said upper and lower electrodes and the upper and lower surfaces of said liquid crystal layer, respectively.

* * * * *